United States Patent
Krippl et al.

(10) Patent No.: US 10,125,804 B2
(45) Date of Patent: Nov. 13, 2018

(54) CLIPWAVE SYSTEM

(71) Applicant: Bayerische Motoren Werke Aktiengesellschaft, Munich (DE)

(72) Inventors: Hermann Krippl, Wallersdorf (DE); Tuba Baskaya, Dingolfing (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 15/612,260

(22) Filed: Jun. 2, 2017

(65) Prior Publication Data

US 2017/0268557 A1 Sep. 21, 2017

Related U.S. Application Data

(63) Continuation of application No. PCT/EP2015/074244, filed on Oct. 20, 2015.

(30) Foreign Application Priority Data

Dec. 4, 2014 (DE) .................. 10 2014 224 929

(51) Int. Cl.
| | |
|---|---|
| *B60R 13/02* | (2006.01) |
| *F16B 21/09* | (2006.01) |
| *F16B 5/06* | (2006.01) |

(52) U.S. Cl.
CPC .......... *F16B 21/09* (2013.01); *B60R 13/0206* (2013.01); *F16B 5/0657* (2013.01)

(58) Field of Classification Search
CPC ..... F16B 21/09; F16B 5/0657; B60R 13/0206
See application file for complete search history.

(56) References Cited

U.S. PATENT DOCUMENTS 5,195,793 A * 3/1993 Maki ................. F16B 5/128
24/297
5,507,610 A * 4/1996 Benedetti ............ F16B 5/0628
24/297

(Continued)

FOREIGN PATENT DOCUMENTS

| DE | 10 2005 020 011 A1 | 11/2006 |
|---|---|---|
| DE | 10 2006 022 890 A1 | 11/2007 |

(Continued)

OTHER PUBLICATIONS

International Search Report (PCT/ISA/210) issued in PCT Application No. PCT/EP2015/074244 dated Dec. 23, 2015 with English translation (five pages).

(Continued)

*Primary Examiner* — Jason W San
(74) *Attorney, Agent, or Firm* — Crowell & Moring LLP

(57) ABSTRACT

An arrangement is provided for fastening a structural element, which has a retaining device that interacts with a T-stud, wherein the T-stud has a stud shaft and a stud head with an underhead having a contact surface for contacting at least one counter-surface formed on the retaining device. The stud shaft can be welded to a component. The at least one counter-surface of the retaining device is designed on a contact shoulder for the underhead of the stud head which encompasses the stud at least in part. A plurality of recesses are designed in the contact shoulder of the retaining apparatus, interrupting the counter-surface, wherein the contact surface of the underhead contacts the contact shoulder of the retaining apparatus in the plane of the countersurface.

7 Claims, 5 Drawing Sheets

(56) References Cited

U.S. PATENT DOCUMENTS

| | | | | |
|---|---|---|---|---|
| 5,651,634 A * | 7/1997 | Kraus | F16B 5/0628 |
| | | | 403/331 |
| 6,594,870 B1 * | 7/2003 | Lambrecht | F16B 5/0628 |
| | | | 24/297 |
| 6,715,185 B2 * | 4/2004 | Angellotti | F16B 5/065 |
| | | | 24/297 |
| 6,796,760 B1 * | 9/2004 | Tanner | F16B 41/002 |
| | | | 411/104 |
| 7,114,221 B2 * | 10/2006 | Gibbons | F16B 5/065 |
| | | | 24/289 |
| 7,165,371 B2 * | 1/2007 | Yoyasu | B60R 13/04 |
| | | | 24/292 |
| 7,698,787 B2 * | 4/2010 | Scroggie | F16B 21/082 |
| | | | 24/297 |
| 7,784,857 B2 * | 8/2010 | Naik | F16B 21/09 |
| | | | 296/193.1 |
| 7,904,994 B2 * | 3/2011 | Girodo | B60R 13/0206 |
| | | | 24/297 |
| 7,954,205 B2 * | 6/2011 | Xueyong | B60R 13/0206 |
| | | | 24/289 |
| 8,291,553 B2 * | 10/2012 | Moberg | B60J 5/0468 |
| | | | 24/297 |
| 8,322,001 B2 * | 12/2012 | Ehrhardt | B60R 13/0206 |
| | | | 24/289 |
| 8,511,631 B2 * | 8/2013 | Kato | B60R 13/0206 |
| | | | 24/297 |
| 8,656,563 B2 * | 2/2014 | Hiramatsu | F16B 41/002 |
| | | | 24/297 |
| 8,671,528 B2 * | 3/2014 | Hayashi | F16B 5/065 |
| | | | 24/297 |
| 8,902,580 B2 * | 12/2014 | Zhou | H01L 23/36 |
| | | | 165/80.3 |
| 8,979,156 B2 * | 3/2015 | Mally | F16B 5/0657 |
| | | | 24/297 |
| 9,216,703 B2 * | 12/2015 | Lauxen | B60R 13/0206 |
| 9,435,369 B2 * | 9/2016 | Deck | F16B 39/24 |
| 9,670,947 B2 * | 6/2017 | Bachelder | B60R 13/0206 |
| 9,739,298 B2 * | 8/2017 | Fellows | F16L 317/00 |
| 2004/0184896 A1 * | 9/2004 | Tanner | F16B 41/002 |
| | | | 411/119 |
| 2006/0248691 A1 | 11/2006 | Rosemann | |
| 2007/0107174 A1 * | 5/2007 | Bordas | B60R 13/0206 |
| | | | 24/664 |
| 2007/0262218 A1 | 11/2007 | Rosemann et al. | |
| 2008/0181745 A1 | 7/2008 | Naik et al. | |
| 2008/0286067 A1 * | 11/2008 | Swayne | F16B 21/09 |
| | | | 411/182 |
| 2012/0010638 A1 | 1/2012 | Wimmer et al. | |
| 2015/0322985 A1 * | 11/2015 | Scroggie | F16B 19/008 |
| | | | 29/428 |
| 2015/0337882 A1 * | 11/2015 | Iwahara | F16B 5/0657 |
| | | | 24/489 |
| 2016/0176363 A1 * | 6/2016 | Bachelder | B60R 13/0206 |
| | | | 24/292 |
| 2016/0288733 A1 * | 10/2016 | Akazawa | F16B 5/0657 |
| 2016/0368433 A1 * | 12/2016 | Vega Velazquez | |
| | | | B60R 13/0206 |
| 2017/0051780 A1 * | 2/2017 | Dickinson | B29C 45/006 |
| 2017/0210305 A1 * | 7/2017 | Shen | B60R 13/0206 |

FOREIGN PATENT DOCUMENTS

| | | |
|---|---|---|
| DE | 20 2010 008 001 U1 | 9/2010 |
| EP | 0 190 029 A2 | 8/1986 |
| EP | 1 092 811 A2 | 4/2001 |
| GB | 1075969 | 7/1967 |

OTHER PUBLICATIONS

German-language Written Opinion (PCT/ISA/237) issued in PCT Application No. PCT/EP2015/074244 dated Dec. 23, 2015 (five pages).

German Search Report issued in counterpart German Application No. 10 2014 224 929.5 dated Sep. 1, 2015 with partial English translation (15 pages).

* cited by examiner

Section B-B

CLIPWAVE SYSTEM

CROSS REFERENCE TO RELATED APPLICATIONS

This application is a continuation of PCT International Application No. PCT/EP2015/074244, filed Oct. 20, 2015, which claims priority under 35 U.S.C. § 119 from German Patent Application No. 10 2014 224 929.5, filed Dec. 4, 2014, the entire disclosures of which are herein expressly incorporated by reference.

BACKGROUND AND SUMMARY OF THE INVENTION

The invention relates to an arrangement for fastening a retaining element which consists of plastic to a metal surface, having a retaining device which interacts with a T stud, step stud or the like. The T stud has a stud shank and a stud head with an underhead with a bearing face for bearing on at least one corresponding face which is formed on the retaining device. It is possible for the stud shank to be welded to a metal surface, and the at least one corresponding face of the retaining device is configured on at least one bearing shoulder for the underhead of the stud head, which bearing shoulder encloses the stud shank at least partially.

In automotive engineering, but also generally in metal construction, it is often necessary to weld studs to workpieces, for example body surfaces, to which studs retaining elements are subsequently fastened which then serve to fix other components. During welding of studs of this type, the drawn arc stud welding method is often used, in which, at the beginning of the welding operation, the stud is first of all placed on the welding point and is subsequently lifted up by means of a lifting mechanism, first of all an auxiliary arc of low current and subsequently a main arc igniting between the stud and the workpiece. The main arc produces the material melt on the body panel and the stud base, and the stud is subsequently moved toward the workpiece and pressed onto it. The two melting zones, namely that melting zone in the base material and the further melting zone on the stud, are combined and the melting zone solidifies after the current is switched off. In this connecting operation, spraying of liquid molten material occurs, with the result that welding or melting particles can be fixed under the stud in the region of the stud underhead. Since a retaining device with a bearing shoulder, on which the underhead of the T stud comes into contact, is arranged on the retaining element, it is often the case in a contamination of this type that it is not the underhead, but rather melting or welding particles which pass between the underhead and the bearing shoulder. As a result, the fastening quality is reduced because the retaining element is not fastened in the correct position.

It is therefore an object of the invention to provide an arrangement for fastening a retaining element, in which arrangement the retaining element can be fastened correctly on the stud and post-processing of the bearing face of the underhead can be eliminated.

The object of the invention is achieved by virtue of the fact that recesses which interrupt the corresponding face are configured in the bearing shoulder.

This measure makes it possible for the welding beads to enter into the recesses in the bearing shoulder, with the result that the bearing face of the underhead can come into contact on the corresponding face. In alternative embodiments, the recesses can be of sufficiently deep configuration such that, when welding beads and the intermediate wall between the recesses come into contact, the intermediate wall can be pressed to the side. The result is that the position of the retaining element always remains positionally correct.

It is favorable here that a U-shaped passage with a circumferential side wall is formed on the retaining device, through which side wall the shank of the stud protrudes, the at least one bearing shoulder which is provided with the recesses protruding inward on the side wall, and the bearing shoulder extending continuously on the side wall around the U-shaped passage.

A multiplicity of recesses with a multiplicity of undulation peaks can be configured in the bearing shoulder. The undulation peaks in their entirety form the corresponding face. Here, the undulations are sufficiently deep that the undulation peaks can form the upper edge of a movable wall and a certain yielding movement is made possible for the edge and/or the undulation peak.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
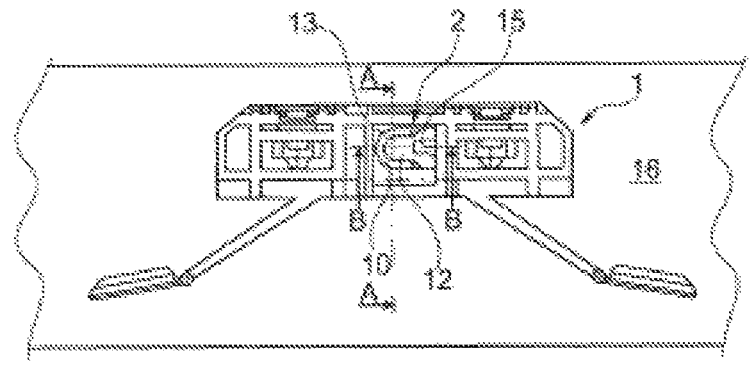
FIG. 1 is a front view of a retaining element having a retaining device.

FIG. 1 shows a view from the front of a retaining element 1 having a retaining device 2. The retaining element 1 is held by a T stud 3 (cf. FIG. 4) and serves to block a component which can be a structural element of a motor vehicle, for example a rail or trim part. As can be seen from FIG. 5, the retaining device 2 which is configured on the retaining element has a bottom wall 9, in which a U-shaped passage 12 with a circumferential side wall 13 is formed. In the exemplary embodiment which is shown, the retaining device 2 is arranged in a somewhat depressed manner on the retaining element. Here, a bearing shoulder 10 which is provided with recesses and protrudes radially inward is configured on the side wall 13 approximately halfway up the height of the wall. The bearing shoulder 10 has a corresponding face 8, onto which the underhead 6 of a stud head 5 of the T stud 3 can come into contact, cf. FIGS. 7A and 7B.

The T studs 3 are welded at the base of the stud shank onto a metal surface 16, the stud head serving as a locking device for fastening elements. Despite their small size and, as a result, extremely low overall height with respect to the component, they achieve very high strength values in the welded connection.

Figure 4:
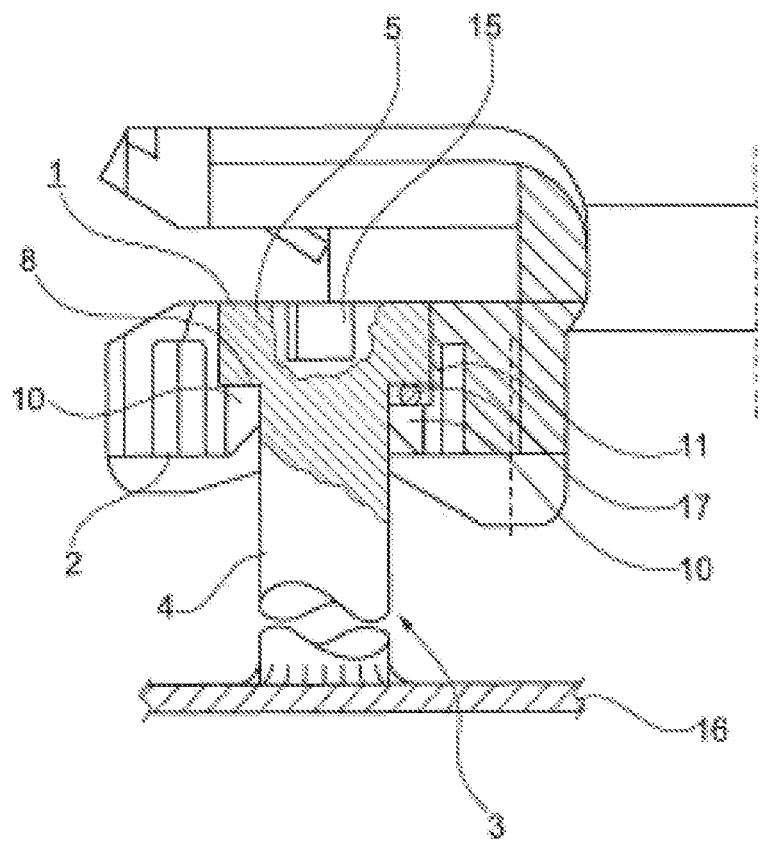
FIG. 4 is a sectional detailed view of the retaining element from FIG. 1 of detail A-A.
Figure 5:
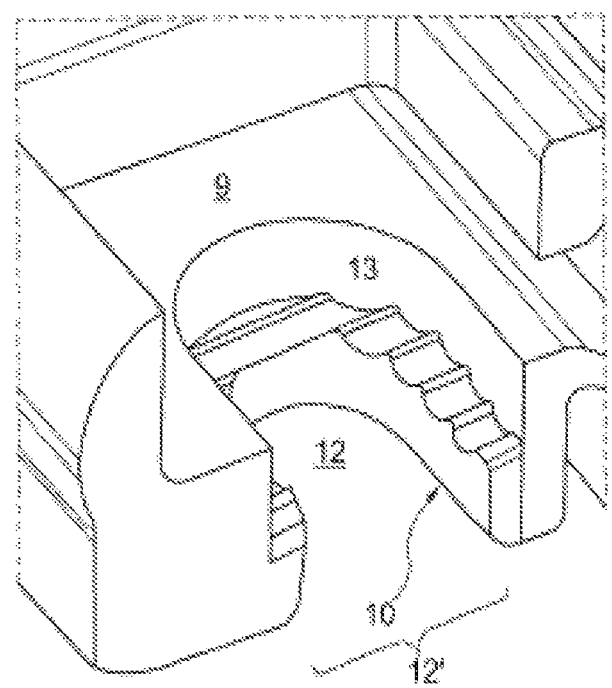
FIG. 5 is a perspective view obliquely from above of a detail of the retaining device from FIG. 1.
Figure 7A:
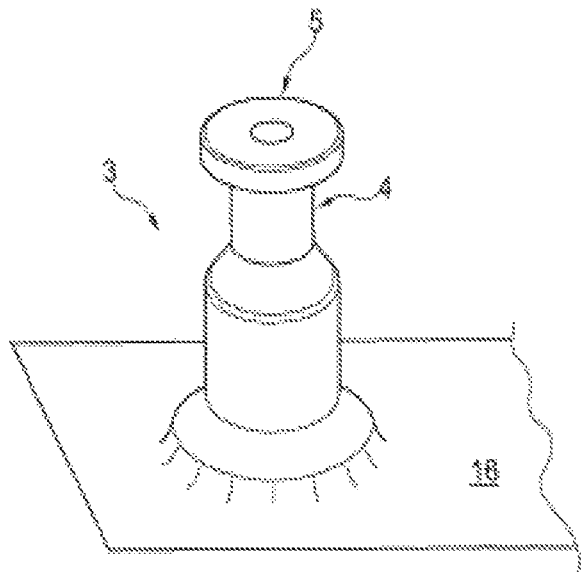
FIG. 7A is a perspective view of a T stud with a recessed shank.
Figure 7B:
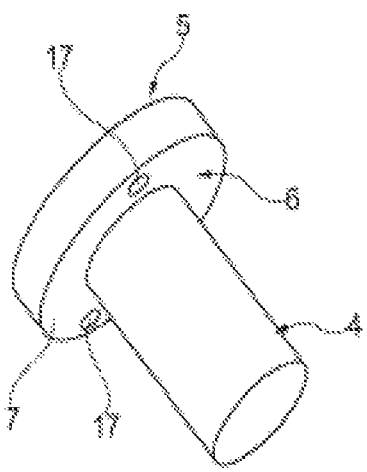
FIG. 7B is a perspective view of a T stud with a continuous shank.

As can be seen from FIGS. 4 and 7A, the bearing face 7 on the underhead 6 of the stud head 5 of the T stud 3 points toward the welded connection. The welding operation is usually a drawn arc stud welding process, in which spraying of molten material spatters 17 can occur which can be deposited on the bearing face 7 of the underhead 6, cf. FIGS. 4 and 7B.

Figure 2:
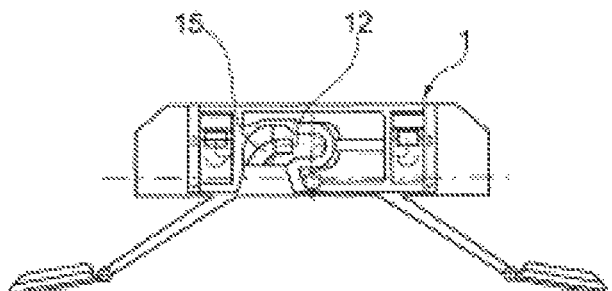
FIG. 2 is a rear view of the retaining element from FIG. 1 with the retaining device.
Figure 3:
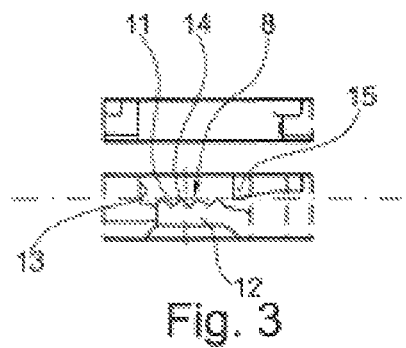
FIG. 3 is a sectional detailed view of the retaining element from FIG. 1 of detail B-B.
Figure 6:
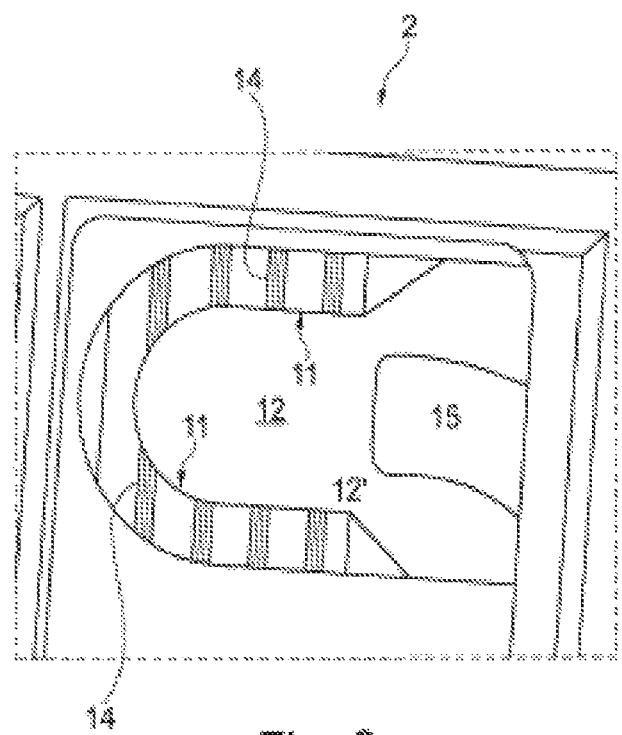
FIG. 6 is a view of the detail of the retaining device from FIG. 5 with a locking pawl.

Recesses 11 which interrupt the corresponding face 8 are configured in the bearing shoulder 10. Contaminants which are fixed on the bearing face 7 of the underhead 6, for example welding particles 17, can enter into said recesses 11, with the result that the underhead 6 can come into contact on the corresponding face 8 which extends between the recesses 11 of the bearing shoulder 10. In the exemplary embodiment which is shown, as can be seen from FIGS. 3 and 5, the multiplicity of recesses 11 consist of a plurality of undulations, the undulation peaks 14 of which form the corresponding face 8. The undulations run in the direction of the opening 12'0 of the U-shaped passage 12, with the result that all undulation peaks 14 are arranged parallel to one another, cf. FIGS. 3, 5 and 6. As can be seen, in particular, in FIGS. 1, 2 and 6, a locking pawl 15 which is sprung in the direction of the stud shank is arranged in front of the opening 12' of the U-shaped passage 12 on the retaining device 2. The locking pawl 15, in the locked position, prevents the stud from exiting out of the U-shaped passage 12 counter to the snapping-in direction.

In one design variant (not shown), a cutout of the retaining shoulder can be configured on the side wall, the consequence of which cutout is that the bearing shoulder is given a certain degree of freedom of movement. It can likewise be provided in one embodiment (not shown) that the undulation peaks produce the bearing face of an inwardly extending rib, with the result that, in the case of a cutout which is carried out at the same time, a high degree of freedom of movement of a bearing rib of this type is obtained toward the side wall, and said bearing rib can avoid a relatively large welding spatter in an improved manner.

The undulation troughs which extend downward through the bearing shoulder in this way can compensate for relatively great contamination of the underhead of the stud head.

LIST OF DESIGNATIONS

Retaining element (1)
Retaining device (2)
T stud (3)
Stud shank (4)
Stud head (5)
Underhead (6)
Bearing face of the underhead (7)
Corresponding face on the bearing shoulder (8)
Bottom wall (9)
Bearing shoulder (10)
Recesses (11)
Passage (12)
Side wall (13)
Undulation peak (14)
Locking pawl (15)
Metal surface (16)
Molten material or welding spatters (17)

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An arrangement for fastening a plastic retaining element to a metal surface, the arrangement comprising:
   a retaining device, on which a bottom wall is configured;
   a T-stud having a stud shank and a stud head, the stud head having an underhead with a contact surface that contacts at least one counter-surface formed on the retaining device, wherein
   the stud shank is welded to the metal surface,
   the at least one counter-surface of the retaining device is configured on at least one bearing shoulder that interacts with the underhead of the stud head,
   the at least one bearing shoulder encloses the stud shank at least partially, and
   a plurality of recesses are configured in the bearing shoulder of the retaining device, the recesses interrupting the counter-surface such that when the retaining device is located on the stud head, the recesses form gaps between the underhead of the stud head and the bearing shoulder.

2. The arrangement according to claim 1, wherein
   a U-shaped passage with a circumferential side wall is formed on the retaining device, through which side wall the shank of the T-stud protrudes, and
   the at least one bearing shoulder protruding inward from the side wall and provided with the plurality of recesses.

3. The arrangement according to claim 2, wherein
   the bearing shoulder extends continuously on the side wall around the U-shaped passage, and
   the plurality of recesses are configured as a plurality of undulations, wherein peaks of the undulations form the counter-surface and troughs of the undulations form the gaps.

4. The arrangement according to claim 3, wherein
   the undulations extend in a direction of an opening of the U-shaped passage, and
   the peaks of the undulations are arranged parallel to one another.

5. The arrangement according to claim 4, further comprising:
   a locking pawl sprung in a direction of the stud shank, the locking pawl being arranged in front of the opening of the U-shaped passage on the retaining device, and
   wherein the locking pawl prevents the stud from exiting the U-shaped passage in the locked position.

6. The arrangement according to claim 1, wherein the retaining element is a retaining clip for a component of a motor vehicle.

7. The arrangement according to claim 1, wherein the T-stud is a step stud.

* * * * *